May 14, 1957 W. G. PFANN 2,792,540

JUNCTION TRANSISTOR

Filed Aug. 4, 1955

INVENTOR
W. G. PFANN

BY Arthur J. Torsiglieri
ATTORNEY

United States Patent Office
2,792,540
Patented May 14, 1957

2,792,540

JUNCTION TRANSISTOR

William G. Pfann, Basking Ridge, N. J., assignor to Bell Telephone Laboratories, Incorporated, New York, N. Y., a corporation of New York Application August 4, 1955, Serial No. 526,499

5 Claims. (Cl. 317—235)

Figure 1A:
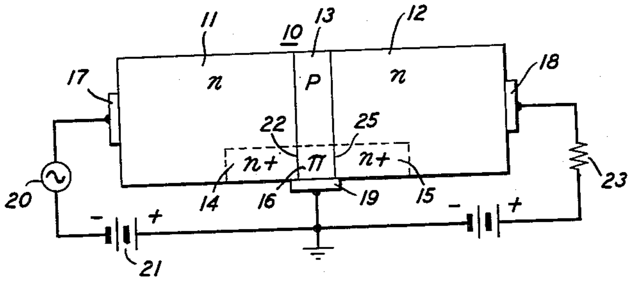

This invention relates to semiconductive devices.

It has particular application to such devices which include a semiconductive body having a zone of one conductivity type intermediate between a pair of zones of opposite conductivity type. Such a device is now generally described as a junction transistor, the intermediate zone being termed the "base," the two surrounding zones the "emitter" and "collector". In the usual form of a junction transistor, a separate electrode connection is provided to each of the zones. The general principles of junction transistors are described in the Physical Review, volume 83, pages 151 to 162, in an article entitled "p-n Junction Transistors".

A primary object of the present invention is to improve the high frequency characteristics of junction transistors, thereby to increase the upper limit of their operating frequency range.

An important factor limiting the high frequency performance of the usual form of junction transistor is the high base resistance generally associated with transistors otherwise designed for high frequency operation. Since the base resistance is common to both the emitter-base and collector-base branches of the circuit of a junction transistor, a high base resistance makes for circuit instability, especially when the operation is at high frequencies. Although the base resistance of a junction transistor can be lowered by decreasing the size of the semiconductor body and so reducing the relevant dimensions of the base region, there is a limit beyond which it is impractical and inconvenient to decrease the size of the semiconductive body.

One expedient that has been employed hitherto to reduce the base resistance and thus to achieve improved high frequency performance is to employ two distinct low resistance connections to the base zone on opposite sides of the semiconductive body between which connections there is applied a steady D.-C. potential bias. It is convenient to designate one such connection as the base electrode and the other as the auxiliary electrode. A junction transistor of this kind is now generally described as a tetrode junction transistor. The theory of operation of a transistor of this kind is set forth in a paper entitled "A Junction Transistor Tetrode for High Frequency Use," page 1395, Proceedings of the Institute of Radio Engineers, November 1952.

In the operation of a tetrode transistor the emitter and collector electrodes are biased with respect to the base electrode approximately in the same manner as they are in a three-electrode junction transistor. In addition, a potential difference is established between the base electrode and the auxiliary electrode to establish a potential gradient along the emitter-base junction. The magnitude and direction of the potential difference maintained between the emitter electrode and the auxiliary electrode are adjusted so that in operation only that portion of the emitter-base junction in the immediate vicinity of the base electrode is properly biased for the injection there of minority charge carriers into the base zone. As a result, all the transistor action takes place very near the base electrode with a consequent reduction in the base lateral resistance and an improvement in high frequency performance.

Although such a tetrode transistor has a better high frequency characteristic than a three-electrode transistor of corresponding size, this improvement in the high frequency characteristic is achieved at the expense of an increase in the complexity both of the physical structure of the transistor itself and of its associated circuitry.

Accordingly, a more specific object of the present invention is to realize the advantages brought to junction transistors by the added electrode without actually adding it.

A feature of the present invention is a semiconductive body which includes two terminal zones of one conductivity type and a zone of opposite conductivity type intermediate therebetween, characterized in that a restricted portion of the intermediate zone near the surface of the body has a specific resistivity which is considerably higher than the specific resistivity of the bulk portion. This restricted portion extends between the two terminal zones and forms a high resistance channel therebetween. For use as a junction transistor, emitter and collector electrodes are provided which make low resistance connections to the two terminal zones, and a base electrode is provided which makes low resistance connection with the intermediate zone, advantageously to the high resistivity portion of the intermediate zone.

In semiconductive body of the kind described, it is characteristic that the electrostatic fields which are established by the electrostatic charges within the body at the barriers between zones of different conductivity types and between portions of different resistivities serve to confine to the restricted portion of the base the flow of current from the emitter to the collector. As a consequence, the desired end of localizing the transistor action in a narrow region of the base is realized without the use of an added electrode connection to the base.

In an illustrative embodiment of the invention, a junction transistor includes a semiconductive body which comprises a pair of terminal zones of one conductivity type and an intermediate zone of opposite conductivity type of which a surface portion is of a higher specific resistivity than its bulk portion, and emitter, collector and base electrodes are connected respectively to the two terminal zones and the surface portion of the intermediate zone. In a preferred embodiment, the emitter and collector zones are provided with surface portions of lower resistivity than the bulk portions of the respective zones, such low resistivity surface portions being contiguous with the high resistivity surface portion of the base.

Figure 1B:
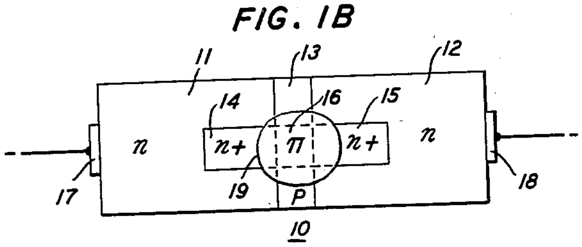
Figure 2:
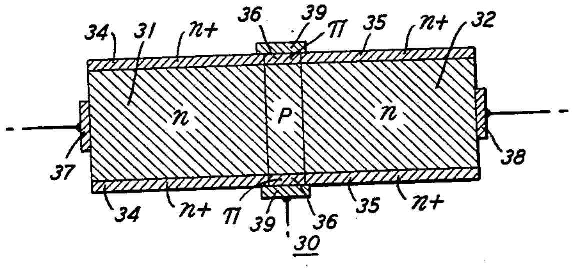
Figure 3:
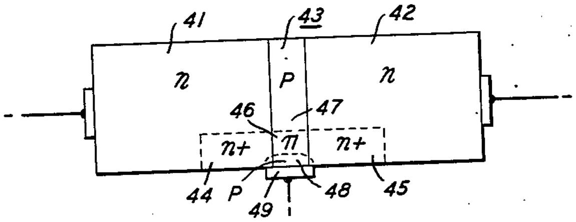

The invention will be better understood from the following more detailed description taken in conjunction with the accompanying drawings in which:

Figs. 1A and 1B show side and bottom views, respectively, of an illustrative embodiment of the invention, Fig. 1A shows such embodiment connected in an amplifier arrangement; and Figs. 2 and 3 show in sectional view alternative embodiments of the invention.

With reference now more particularly to the drawings, the junction transistor shown in Figs. 1A and 1B includes a semiconductive body 10, typically of monocrystalline germanium or silicon, which includes a pair of terminal zones 11, 12 of n-type conductivity and an intermediate zone 13 of p-type conductivity. Typically, the body may be a wafer 50 mils long and ten mils square with the intermediate zone 13 a fraction of a mil wide. However, it has been found preferable to show the figures not to scale.

Various techniques are now known for preparation of such bodies, including techniques known as "rate growing" and "double doping." Terminal zones 11 and 12 include surface portions 14 and 15, respectively, which are of higher specific conductivity (lower specific resistivity) than the bulk portions of such zones. Such surface portions are shown designated as "n+" type in the drawing. The intermediate zone 13 includes a surface portion 16 which is of lower specific conductivity (higher specific resistivity) than the bulk portion of such zone, and such surface portion is shown designated as of "π" type in the drawing. Surface portion 16 is intermediate between and contiguous with surface portions 14 and 15 so that surface portions 14, 15 and 16 form a continuous surface portion of the body. Each of these surface portions is restricted in depth as seen in Fig. 1A and laterally as seen in Fig. 1B. Typically the depth of penetration of such surface portions is advantageously limited to a very small fraction of the height of the base zone, for example, half a mil or less. Techniques for the formation of surface portions of the kind described are set forth hereinafter. Emitter and collector electrodes 17 and 18 make low resistance connections to terminal zones 11 and 12, respectively. Base electrode 19 makes low resistance connection only to the intermediate zone 13, and, advantageously, as shown, to the high resistance surface portion 16 thereof. Various techniques are known for making electrode connections of this kind. In particular, by including in the base electrode 19 a conductivity-type determining impurity of the type characteristic of the conductivity type of the base zone and, accordingly, opposite to that characteristic of the emitter and collector zones there is minimized any adverse effects from having the base electrode 19 overlap either or both of the emitter and collector zones since such contact will form a high resistance rectifying connection. Although in the drawing the base connection is shown overlapping the base zone and making contact to the emitter and collector zones, such overlapping is neither necessary nor desirable from operating considerations but rather ordinarily simplifies the fabrication of the transistor since it obviates the need for precisely locating the limits of the base zone and accurately confining the base connection within such limits. Accordingly, when feasible from a fabrication standpoint, it is advantageous to limit the base electrode to connection to only the base zone.

A junction transistor of the kind described may be operated in the manner of previously known junction transistors. Typically, as shown, there are provided an emitter-base circuit between electrodes 17 and 19 which includes a signal source 20 and a voltage source 21 for biasing the emitter junction 22 in the forward direction and a base-collector circuit connected between electrodes 18 and 19 which includes a load 23 and a voltage source 24 for biasing the collector junction 25 in the reverse direction.

However, it will be characteristic of a junction transistor of the kind described that the transistor action will be localized in the region of the π-type portion of the base zone. In particular, it will be the case that the potential barrier to electrons for flow from the emitter to the base will be lower along that portion of the emitter junction 22 corresponding to the junction between the n+ type region 14 and π-type region 16 than along the remainder of the emitter junction. This results in an emitter efficiency, generally designated as "gamma", higher along such portion. In particular, the specific resistivity of the π-type portion 16 should be considerably higher, advantageously ten and as much as ten thousand times that of the remainder of the base zone. Typically, the n-type zones 11 and 12 have specific resistivities of about .01 ohm-centimeter and .5 ohm-centimeter, respectively, and the specific resistivity of the base zone varies from about .05 ohm-centimeter in the bulk portion to about 10 ohm-centimeters in the surface portion 16. Moreover, there will be set up at the interface between the π-type portion 16 and the p-type bulk portion of the base zone an electrostatic potential barrier which advantageously inhibits the lateral flow of electrons from the π-type bulk portion to the p-type surface portion.

Accordingly, the effect of the electrostatic potential barriers between the n+ type portion 14 and π-type portion 16 and between the π-type portion 16 and the p-type bulk portion of the base zone is to localize the diffusion of minority carriers in the base zone to the π-type surface portion 16. By restricting the depth of this surface portion 16 and by making the base electrode connection to such surface portion, the effective base resistance of the junction transistor may be kept extremely low, which is the end sought.

Various techniques are feasible for forming surface portions 14, 15 and 16. In particular, it is especially convenient to form such surface portions by the gaseous diffusion of a donor impurity into the corresponding surface portion of the body. To this end, the body after appropriate masking of the major portion of the body is heated to a suitable diffusion temperature for an appropriate time in an evacuated oven in the presence of the vapor of a donor, such as antimony or arsenic, for the diffusion of the donor into the unmasked surface portion of the body. The diffusion of such donor into the n-type terminal zones 11 and 12 will result in the formation of the n+ surface portions 14 and 15, and its diffusion into a surface portion 16 of the p-type intermediate zone 13 will result in the compensation of some of the acceptor impurities in such surface portion and a consequent reduction in the conductivity and increase in resistivity of such surface portion of the intermediate zone. The depth of penetration of the donor diffusant is controlled by the diffusion temperature and diffusion time. The concentration of the diffusant in the diffused regions may be controlled by the vapor pressure of the diffusant as well as the diffusion temperature. The general principles of the surface diffusion of conductivity-type determining impurities from a vapor state into a surface of a semiconductive body are described in copending application Serial No. 414,272, by C. S. Fuller.

Alternatively, a thin film of a donor element may be evaporated over a restricted portion of the surface of the body and the body thereafter heated to diffuse the donor into the body to form surface portions 14, 15 and 16 of the kind described.

Various other techniques to this same end will be known to workers skilled in the art.

Moreover, when the junction transistor comprises a semiconductive body in which the specific resistivity of the base zone is graded, the diffusion therein of a donor in the manner described will effectively act to reduce the width of the base zone and in this respect, too, will result in an improvement in its high frequency operating characteristics.

By control of the lateral extent of the portion of the body which is to be active for transistor action there is controlled the capacitance of the emitter junction, a factor of interest in fixing the upper frequency limit of useful operation of the transistor. When it is important to keep the emitter capacitance low, it is advantageous to employ only a restricted portion of the surface area of the intermediate zone for transistor action as in the embodiment just described. However, when a high emitter capacitance may be tolerated, it is feasible to make use of the entire surface portion of the intermediate zone of the body for transistor action.

In Fig. 2 there is shown a junction transistor in accordance with the invention in which the entire surface portion of the intermediate zone of the body is used for transistor action. The semiconductive body 30 shown in Fig. 2 includes the terminal zones 31 and 32 which are spaced apart by the p-type intermediate zone 33. Each of the n+ type surface portions 34 and 35 completely circumscribes terminal zone 31 and 32, respectively, and $\pi$-type surface portion 36 completely circumscribes the intermediate zone 33. Emitter electrodes 37 and 38 make low resistance ohmic connections to terminal zones 31 and 32, respectively, and the ring-like base electrode 39 surrounds the intermediate zone 33, making low resistance connection to the $\pi$-type surface portion 36.

Surface portions of the kind described may be formed in a manner similar to that previously described. In this instance a donor impurity is diffused over the entire surface of the body which is left unmasked for penetration therein a prescribed amount for modifying the resistivity of surface portions of the body, as desired, and more particularly increasing the resistivity of the surface portion of the intermediate zone of the body.

As is discussed more fully in my copending application Serial No. 475,709, filed December 16, 1954 it is often desirable to localize transistor action to the interior of the body, whereby surface effects are minimized. In Fig. 3, there is shown as another embodiment of the invention a junction transistor 40 in which the transistor action may to a considerable extent be localized to a portion of the intermediate zone slightly in from the surface of the body. Basically, such transistor resembles that shown in Figs. 1A and 1B. As before, the semiconductive body includes emitter, base and collector zones 41, 42 and 43, respectively. The emitter and collector zones include high conductivity surface portions 44 and 45, respectively, and the base zone includes a high resistivity portion 46 which is intermediate between the bulk portion 47 and the surface portion 48 both of which are of lower resistivity.

Various techniques are feasible for the fabrication of a body of this kind. Typically, there is first formed a high resistivity surface portion on the base zone by the diffusion therein of a donor as previously described. Reconversion of the surface portion to low resistivity is effected by including in the base electrode 49 an acceptor such that recrystallization of the molten alloy formed when the base electrode is fused to the body results in a low resistivity portion of the base zone in immediate contact with the base electrode.

While the invention has been described specifically with reference to an n-p-n type body, the principles are similarly applicable to a p-n-p type body and to bodies which include an intrinsic region intermediate between the base and collector zones for improved high frequency response.

Moreover, the principles are applicable to bodies of semiconductors other than germanium or silicon, such as germanium-silicon alloys and group III–group V intermetallic compounds such as indium antimonide and aluminum arsenide.

Additionally, the principles of the invention are applicable to junction transistors which have been formed by one or more diffusion steps, and in which the base zone particularly is formed by diffusion. Processes of this kind are described in the copending application Serial No. 516,674, filed June 20, 1955, by C. S. Fuller and M. Tanenbaum.

What is claimed is:

1. A junction transistor comprising a semiconductive body having emitter, base and collector zones, the base zone being characterized in having a portion adjacent one surface which has a specific resistivity higher than the bulk portion of the zone, emitter and collector electrodes making low resistance connection to the respective emitter and collector zones, and a base electrode making low resistance connection to a region of the surface of the base zone adjacent the high resistivity portion.

2. A junction transistor comprising a semiconductive body having emitter, base and collector zones, the emitter and collector zones having surface portions of specific resistivity lower than the bulk portions of such zones, and the base zone having a surface portion extending between said low resistivity surface portions of the emitter and collector portions which has a specific resistivity higher than the bulk portion of the zone, and emitter, base and collector electrodes making low resistance connection to the respective emitter, base and collector zones.

3. A junction transistor comprising a semiconductive body having emitter, base and collector zones, characterized in that along one surface of the body the emitter and collector zones have a surface portion of specific resistivity lower than the bulk portions of such zones, and the base zone has a surface portion of specific resistivity higher than that of the bulk portion of the zone, emitter and collector electrodes making low resistance connections to the respective emitter and collector zones, and a base electrode making low resistance connection to the high resistivity surface portion of the base zone.

4. A junction transistor comprising a semiconductive body having emitter, base and collector zones, the base zone being characterized in that the surface portion of said base zone is of higher specific resistivity than the bulk portion of said zone, emitter and collector electrodes making low resistance connection to the respective emitter and collector zones, and a base electrode extending around the body and making therealong low resistance connection to the surface portion of said base zone.

5. In combination, a semiconductive body including a pair of terminal zones of one conductivity type and a zone intermediate therebetween of opposite conductivity type, said intermediate zone being characterized by a portion extending between the two terminal zones which has a higher specific resistivity than the bulk portion of said zone, and electrodes associated with each of said zones for making low resistance connection thereto, the electrode associated with the intermediate zone being positioned adjacent its high resistivity portion.

References Cited in the file of this patent

UNITED STATES PATENTS 2,681,993 Shockley -------------- June 22, 1954